United States Patent
Bool, III et al.

(10) Patent No.: US 6,699,030 B2
(45) Date of Patent: *Mar. 2, 2004

(54) COMBUSTION IN A MULTIBURNER FURNACE WITH SELECTIVE FLOW OF OXYGEN

(75) Inventors: Lawrence E. Bool, III, East Aurora, NY (US); Hisashi Kobayashi, Putnam Valley, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/194,601

(22) Filed: Jul. 11, 2002

(65) Prior Publication Data

US 2003/0091948 A1 May 15, 2003

Related U.S. Application Data

(63) Continuation-in-part of application No. 09/757,611, filed on Jan. 11, 2001, now abandoned.
(60) Provisional application No. 60/380,817, filed on May 15, 2002, and provisional application No. 60/380,818, filed on May 15, 2002.

(51) Int. Cl.[7] ............................ F23M 3/04; F23M 3/02; F23J 11/00
(52) U.S. Cl. ............................ 431/10; 431/8; 110/345
(58) Field of Search ............................ 431/10, 8, 351; 110/344, 345, 348

(56) References Cited

U.S. PATENT DOCUMENTS

| | | |
|---|---|---|
| 3,656,878 A | 4/1972 | Wright |
| 3,873,671 A | 3/1975 | Reed et al. |
| 4,329,932 A | 5/1982 | Takahashi et al. |
| 4,343,606 A | 8/1982 | Blair et al. |
| 4,388,062 A | 6/1983 | Bartok et al. |
| 4,408,982 A | 10/1983 | Kobayashi et al. |
| 4,427,362 A | 1/1984 | Dykema |
| 4,488,866 A | 12/1984 | Schirmer et al. |
| 4,495,874 A | 1/1985 | Greskovich et al. |
| 4,515,095 A | 5/1985 | Greskovich |
| 4,541,796 A | 9/1985 | Anderson |
| 4,556,384 A | 12/1985 | Laurenceau et al. |
| 4,570,549 A | 2/1986 | Trozzi |
| 4,596,198 A | 6/1986 | Greskovich et al. |
| 4,761,132 A | 8/1988 | Khinkis |
| 4,797,087 A | 1/1989 | Gitman |
| 4,863,371 A | 9/1989 | Ho |

(List continued on next page.)

FOREIGN PATENT DOCUMENTS

| | | |
|---|---|---|
| DE | 4142401 | 6/1993 |
| EP | 0187441 | 7/1986 |
| EP | 0653590 | 11/1994 |

OTHER PUBLICATIONS

Michelfelder, S. et al., "Transfert de chaleur et pollution", Revue Generale De Thermique, No. 196 (Apr. 1978), p. 324 (with translation).

Sarofim, A.F. et al., "Strategies For Controlling Nitrogen Oxide Emissions During Combustion Of Nitrogen–Bearing Fuels", The American Institute of Chemical Engineers, (1978), No. 175, vol. 74, pp. 67–92.

(List continued on next page.)

*Primary Examiner*—Alfred Basichas
(74) *Attorney, Agent, or Firm*—Donald T. Black

(57) ABSTRACT

Improved operational characteristics such as improved fuel efficiency, reduction of NOx formation, reduction of the amount of unburned carbon in the ash, and lessened tendency to corrosion at the tube wall, in a multi-burner furnace are obtained by reducing the flow rate of combustion air to the burners and selectively individually feeding oxidant to only some of the burners.

13 Claims, 9 Drawing Sheets

U.S. PATENT DOCUMENTS

| | | | |
|---|---|---|---|
| 4,878,830 | A | 11/1989 | Henderson |
| 4,899,670 | A | 2/1990 | Hansel |
| 4,903,901 | A | 2/1990 | Kim et al. |
| 4,946,382 | A | 8/1990 | Kobayashi et al. |
| 4,957,050 | A | 9/1990 | Ho |
| 4,969,814 | A | 11/1990 | Ho et al. |
| 4,973,346 | A | 11/1990 | Kobayashi |
| 4,988,285 | A | 1/1991 | Delano |
| 5,000,102 | A | 3/1991 | Ho |
| 5,048,761 | A | 9/1991 | Kim |
| 5,076,779 | A | 12/1991 | Kobayashi |
| 5,085,156 | A | 2/1992 | Dykema |
| 5,158,445 | A | 10/1992 | Khinkis |
| 5,186,617 | A | 2/1993 | Ho |
| 5,195,450 | A | 3/1993 | Marion |
| 5,201,650 | A | 4/1993 | Johnson |
| 5,203,859 | A | 4/1993 | Khinkis et al. |
| 5,213,492 | A | 5/1993 | Ho |
| 5,242,296 | A | 9/1993 | Tuson et al. |
| 5,291,841 | A * | 3/1994 | Dykema ............. 110/347 |
| 5,308,239 | A | 5/1994 | Bazarian et al. |
| 5,387,100 | A | 2/1995 | Kobayashi |
| 5,411,394 | A | 5/1995 | Beer et al. |
| 5,413,476 | A | 5/1995 | Baukal, Jr. et al. |
| 5,439,373 | A | 8/1995 | Anderson et al. |
| 5,454,712 | A | 10/1995 | Yap |
| 5,593,131 | A | 1/1997 | Briggs, Jr. et al. |
| 5,601,425 | A | 2/1997 | Kobayashi et al. |
| 5,609,662 | A | 3/1997 | Kobayashi et al. |
| 5,611,682 | A | 3/1997 | Slavejkov et al. |
| 5,611,683 | A | 3/1997 | Baukal et al. |
| 5,685,240 | A | 11/1997 | Briggs, Jr. et al. |
| 5,725,366 | A | 3/1998 | Khinkis et al. |
| 5,832,847 | A | 11/1998 | Leisse et al. |
| 5,871,343 | A | 2/1999 | Baukal, Jr. et al. |
| 5,879,148 | A | 3/1999 | Cheng et al. |
| 5,904,475 | A | 5/1999 | Ding |
| 5,924,858 | A | 7/1999 | Tuson et al. |
| 5,931,654 | A | 8/1999 | Chamberland |
| 6,007,326 | A | 12/1999 | Ryan, III et al. |
| 6,030,204 | A * | 2/2000 | Breen et al. ............. 431/4 |
| 6,085,673 | A | 7/2000 | Bakker et al. |
| 6,085,674 | A | 7/2000 | Ashworth |
| 6,113,389 | A | 9/2000 | Joshi et al. |
| 6,164,221 | A | 12/2000 | Facchiano et al. |
| 6,171,100 | B1 | 1/2001 | Joshi et al. |
| 6,206,949 | B1 | 3/2001 | Kobayashi et al. |
| 6,244,200 | B1 | 6/2001 | Rabovitser et al. |
| 6,276,928 | B1 | 8/2001 | Joshi et al. |
| 6,289,851 | B1 | 9/2001 | Rabovitser et al. |
| 6,293,105 | B1 | 9/2001 | Claesson et al. |
| 6,314,896 | B1 | 11/2001 | Marin et al. |
| 6,325,003 | B1 * | 12/2001 | Ashworth et al. .......... 110/345 |
| 6,357,367 | B1 * | 3/2002 | Breen et al. ............. 110/345 |
| 6,394,790 | B1 | 5/2002 | Kobayashi |
| 6,398,546 | B1 | 6/2002 | Kobayashi |
| 6,409,499 | B1 | 6/2002 | Feldermann |
| 6,418,865 | B2 | 7/2002 | Marin et al. |
| 6,519,973 | B1 | 2/2003 | Hoke, Jr. et al. |

OTHER PUBLICATIONS

Timothy, L.D. et al., "Characteristics Of Single Particle Coal Combustion", $19^{th}$ Symposium on Combustion, The Combustion Institute (1982), pp. 1123–1130.

Farmayan, W.F. et al., "$NO_x$ and Carbon Emission Control in Coal–Water Slurry Combustion", Sixth International Symposium on Coal Slurry Combustion and Technology, Orlando, FL, (1984).

"Oxygen Enriched Air/Natural Gas Burner System Development", Final Report, Gas Research Institute (1989), pp. 140 and 186–189.

Kobayashi, H. et al., "$NO_x$ Emission Characteristics of Industrial Burners and Control Methods Under Oxygen Enriched Combustion Conditions", International Flame Research Foundation, $9^{th}$ Members Conference, Noordwijkerhout (1989).

Baukal, C.E. et al., "$NO_x$ Measurements In Oxygen–Enriched, Air–Natural Gas Combustion Systems", Fossil Fuel Combustion Symposium, (Amer. Soc. Mech. Eng., 1990), pp. 75–79.

Baukal, C.E. et al., "Oxygen Enrichment Enhances Combustion", Air Products and Chemicals, Inc., (before 1992), pp. 17–23.

Panahi, S.K. et al., "Low–$NO_x$ Technologies For Natural Gas–Fired Regenerative Glass Melters", presented at Scandinavian Society of Glass Technology, Institute of Gas Technology (1992), pp. 1–15.

"Catalog of Technical Reports", Gas Research Institute, (Dec. 1992).

Eddings, E.G. et al. "Advances in the Use of Computer Simulations for Evaluating Combustion Alternatives", presented at the $3^{rd}$ CREST International Symposium on High Temperature Air Combustion and Gasification, Yokohama, Japan (Mar. 2000).

Takano, S. et al. "$CO_2$ Recovery from PCF Power Plant with $O_2/CO_2$ Combustion Process", IHI Engineering Review, Oct. 1995, pp. 161–164.

Campbell, D.A. et al. "Oxy–coal injection at Cleveland Ironworks", Ironmaking and Steelmaking, 1992, vol. 19 No. 2, pp. 120–125.

Riley, M.F. "Effect of Direct Oxygen Injection on Combustion of Injected Coal", Proc. $2^{nd}$ Internat. Cong. on the Sci. and Tech. of Ironmaking, ISS, 1998, pp. 683–688.

Cherry, M. et al. "$NO_x$ Reduction Of A 165 MW Wall–Fired Boiler Utilizing Air And Fuel Flow Measurement And Control", Clearwater Coal Conf. 2002, Clearwater, FL, pp. 365–382.

* cited by examiner

COMBUSTION IN A MULTIBURNER FURNACE WITH SELECTIVE FLOW OF OXYGEN

This application is a continuation-in-part of application Ser. No. 09/757,611 filed Jan. 11, 2001 now abandoned, and claims priority from U.S. Provisional Application Serial No. 60/380,817 filed May 15, 2002 and U.S. Provisional Application Serial No. 60/380,818 filed May 15, 2002. The entire contents of said three applications are hereby incorporated herein by reference.

This invention was made with United States Government support under Cooperative Agreement No. DE-FC26-00NT40756 awarded by the Department of Energy. The United States Government has certain rights in the invention.

FIELD OF THE INVENTION

The present invention relates to combustion of hydrocarbonaceous fuel such as coal.

BACKGROUND OF THE INVENTION

Under the dual pressures of economic deregulation and tightening environmental regulation operators of combustion systems face the difficult task of increasing system efficiency to increase productivity, while simultaneously reducing pollutant emissions. In many combustion systems, such as coal or oil-fired utility boilers, enhancing productivity comes at the expense of increased pollutant emissions, or vice versa.

One of the few areas of boiler or furnace operation that can have a negative impact on both pollution control and productivity is the distribution of fuel and air to the individual burners. It is well known that most boilers or furnaces have significant variations in the amount of either air or fuel, or both, fed to individual burners in a multi-burner array. This variation in air and fuel flow leads to significant stoichiometric ratio variations among the burners, which in turn reduces combustion efficiency and increases pollutant formation. Burners are typically designed to operate within a specific range of stoichiometric ratios to provide a reasonable compromise between good combustion efficiency and low pollutant formation. For example, in a boiler fired with coal, if the air to fuel ratio is too high, the burner operates too "lean" (i.e., fuel-lean) and NOx formation is increased. If the stoichiometric ratio is too low the burner operates too "rich" (i.e., fuel-rich) and CO and unburned carbon increases.

A wide range of factors can lead to problems with air and fuel distribution. Typical solid fuel fired burners, such as those fired with pulverized coal, consist of two main flows. One flow is the transport air, or primary air, which is used to transport fuel from a common feed location to the individual burners. The other flow is the combustion air, or secondary air, which is often supplied through a common windbox. The combustion air stream, which may be subdivided into multiple air streams in the burner, does not mix with the transport air until the burner outlet. For liquid or gas fired systems the combustion air stream may be the only air fed to the burners, other than the minor amount of compressed air used for atomization.

In most combustion systems air for both streams is supplied through the use of a blower. Typical supply pressures are relatively low, in the range of tens of inches of water column. Therefore, even subtle variations in system construction or design can lead to some burners being starved of air, or of fuel if the transport air is similarly affected. Many burners have register dampers that can be opened or closed to control how much air is fed from the windbox. These dampers may also serve to split the secondary air stream into separate streams according to the burner design. However, the damper design and the tolerances required to allow long term operation of the burners make precise flow control to the burners problematic if not impossible. In coal fired utility boilers it is not uncommon to find that the flow rates of air to some of the burners are off by more than 30% from the design values.

With entrained solid fuels, such as coal, the problem of fuel distribution to the burners becomes even more serious. In the case of pulverized coal transport air passes through the pulverizer, or mill, entrains coal that has been pulverized to the desired size, and carries it to the individual burners. With this type of system not only are there issues related to transport air flow to the individual burners, similar to those discussed above, but the problem is compounded by the need to transport a two-phase fluid without permitting separation of the phases in the pipe. For example, as the coal-laden air stream passes around a sharp bend the coal tends to concentrate in one part of the air stream. This phenomenon, called roping, can lead to poor distribution of fuel to the individual burners. Reduction of air flow in any given leg of the distribution system can also lead to settling of the coal from the transport air stream as the velocities are not adequate to keep the solids entrained. In coal fired utility boilers it is not uncommon to find that the coal flow rates to some of the burners are off by more than 30% from the design values.

In addition to the problems associated with maintaining a uniform coal and airflow distribution, some systems may actually require biasing of either the coal or air to specific burners in the array. For example, when a burner is situated adjacent to a sidewall comprising water-cooled tubes (i.e. steam tubes) the flame temperature of that burner can be significantly reduced by heat transfer to the water. Although this reduced flame temperature can help reduce the formation of thermal NOx, it can lead to increases in CO and unburned carbon, if the burner is operated under rich conditions. Furthermore, corrosion of the waterwall may become an issue. To overcome both these problems it may be necessary to bias the air or coal flow to that particular burner such that the burner operates slightly more fuel lean, which serves to increase the flame temperature and combustion efficiency. Given the difficulties associated with creating a simple uniform coal-air distribution, biasing the burners in this fashion is well beyond current commercial practice.

A number of solutions have been proposed to better control both fuel and air flow. These solutions have demonstrated that significant improvements in pollutant emissions and combustion efficiency can be achieved. However, as discussed in the next section, currently available control techniques tend to be limited in their ability to maintain burner balance.

Numerous means have been proposed to control the distribution of fuel and air to individual burners. One is the inclusion in most burners of dampers to control the secondary airflow to the individual burner. The damper assembly is used to close down the cross sectional area of the flow openings in order to restrict the flow of air through the duct. The design of the dampers tends to make flow control very imprecise—making optimization of the flow extremely difficult.

A number of systems, such as those disclosed in U.S. Pat. Nos. 5,685,240, 5,593,131, 6,293,105 and 5,879,148, have been proposed to control the distribution of fuel to an array of burners. These systems preferentially increase the pressure drop through a given leg of the fuel distribution system and/or the air distribution system to control the flow of fuel or air to that specific burner. These systems have been reasonably successful for those burners firing liquid or gaseous fuels, but have been less so for solid fuels due to problems inherent in the transport of a two-phase fluid. These problems include separation of the phases in the transport line and, particularly for solid fuels, erosion of the devices used to control the flow.

Other prior disclosures differ from the present invention in one or more significant ways. U.S. Pat. No. 5,697,306 discloses a device wherein a stream of air is supplied through a so-called "hollow plug". The objective of this device is said to be control of the stoichiometric ratio of the fuel rich portion of a burner. An optimal stoichiometric ratio is disclosed only for this fuel-rich region, based on properties of the fuel. Air is supplied such that it mixes rapidly with the transport air and coal at the exit of the burner to create a mixture with the desired stoichiometric ratio. Even if this invention could be advantageous for controlling the stoichiometric ratio of this fuel rich core, there is no attempt to control the overall stoichiometric ratio of the burner, let alone of an array of burners. Further, by operation of the disclosed device with the addition of a second stream of air based on the coal properties, not on the requirement to balance the burner, operation of this device would quite possibly actually exacerbate the burner to burner unbalance.

U.S. Pat. Nos. 4,903,901 and 5,048,761 describe a system wherein a stream of compressed air is injected into the coal pipe of a burner to control the flow of transport air and coal to that burner. Injecting a stream of compressed air is said to create a recirculation zone within the coal pipe, increasing the pressure drop through the pipe, to limit the flow of coal-laden through the pipe, with an effect similar to that provided by the orifice plates described above. The amount of compressed air supplied, typically up to 1% of the transport air flowrate, is based solely on the need to control flow rather than on any recognition of the need to balance the burners in a multiple-burner furnace.

Most prior art efforts to minimize problems associated with variations in stoichiometric ratio have attempted to create uniform fuel and air flows to each burner in an array of burners. Although these techniques can help to minimize variations, it is extremely difficult to eliminate these variations completely. Thus, there remains a need for an improved method to obtain balance in a plurality of burners, so that each burner operates at a desired optimum of conditions such as the stoichiometric ratio.

BRIEF SUMMARY OF THE INVENTION

One aspect of the present invention is a method for combusting hydrocarbonaceous fuel such as coal in a furnace comprising (A) providing a furnace which comprises a plurality of burners, means for supplying combustion air to each of said plurality of burners including a common source for the combustion air fed to said plurality of burners, and means for supplying hydrocarbonaceous fuel to each of said plurality of burners, wherein at least one of said plurality of burners is operating at a stoichiometric ratio based on the fuel and combustion air being supplied thereto that is above a predetermined optimum, and (B) reducing the flow rate of combustion air through said common source to said plurality of burners to the extent that (1) at least one of said plurality of burners is still operating at a stoichiometric ratio, based on the fuel and combustion air being supplied thereto taking into account said reduced flow rate, that is equal to or above said predetermined optimum, and that (2) at least one of said plurality of burners is operating at a stoichiometric ratio, based on the fuel and combustion air being supplied thereto taking into account said reduced flow rate, that is below a predetermined optimum for that burner, and separately feeding gaseous oxidant to at least one of said plurality of burners which is operating at a stoichiometric ratio that is below its predetermined optimum, in an amount of said oxidant such that the stoichiometric ratio of said burner based on the amount of said oxidant and on the reduced flow of combustion air thereto is closer to said predetermined optimum.

In some preferred embodiments, oxidant fed to at least one burner has an oxygen content different from the oxygen content of oxidant fed to any other burner. In other preferred embodiments, the total flow rate of said gaseous oxidant separately fed to at least one burner is 1 to 20% and more preferably 5 to 10% of the stoichiometric oxygen required for the combustion of said hydrocarbonaceous fuel fed to said burner.

As used herein, "stoichiometric ratio" means the ratio of oxygen fed, to the total amount of oxygen that would be necessary to convert fully all carbon, sulfur and hydrogen present in the substances comprising the feed to carbon dioxide, sulfur dioxide, and water.

As used herein, "NOx" means oxides of nitrogen such as but not limited to $NO$, $NO_2$, $NO_3$, $N_2O$, $N_2O_3$, $N_2O_4$, $N_3O_4$, and mixtures thereof.

As used herein, "furnace" means a device which, together with the burners and the means for feeding fuel and air as described herein, comprises a combustion chamber wherein said fuel combusts with said air to generate heat of combustion and gaseous combustion products, flue means for enabling said combustion products to leave the combustion chamber, and heating means for using said heat of combustion to produce steam.

As used herein, "burner" means a means for feeding fuel and oxidant into a furnace either already commingled or such that the fuel and an associated stream of oxidant commingle within the furnace, whereby the fuel and oxidant combust. Examples of burners include burners as depicted in FIGS. 1 and 2, wherein a fuel stream and an oxidant stream are fed such that one stream surrounds the other as they enter the furnace, and burners depicted in FIG. 3 wherein fuel and oxidant enter the furnace from adjacent ports such that the fuel and oxidant commingle and combust inside the furnace.

As used herein, "staged combustion" means combustion in a furnace wherein a portion of the combustion air (the "over fire air") required for complete combustion of the fuel is fed to the furnace not through or immediately adjacent any burner but instead through one or more inlets situated between the burner(s) and the furnace flue means, and is fed without an associated feed of fuel.

DETAILED DESCRIPTION OF THE INVENTION

Figure 1:
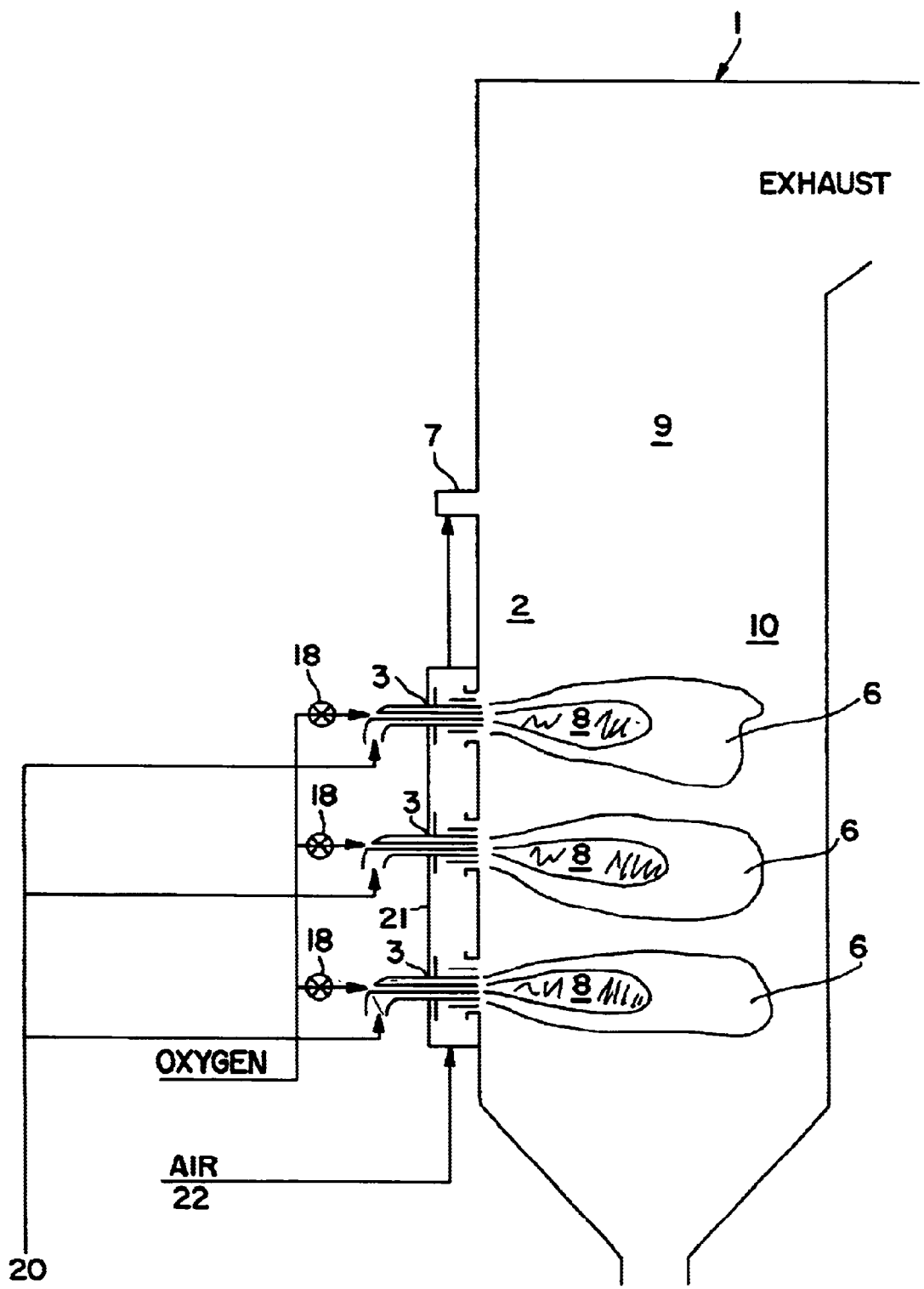
FIG. 1 is a cross-sectional representation of one embodiment of apparatus useful for carrying out the present invention.

The invention discussed here, in contrast to the approaches used in the prior art described above, recognizes that the fuel and air flows to each burner can continue to be non-uniform. This invention uses one or more additional oxidant flows to balance the burners. These oxidants can be any combination of air, recycled flue gas, nitrogen and oxygen with oxygen concentrations ranging from 1 to 100% and are delivered to each burner through separate supplies in a manner that permits the oxygen content of the oxidant stream fed to each burner to be adjusted for each burner as necessary to provide the desired amount of oxygen to be fed to each burner. In one preferred embodiment, each oxidant stream has an oxygen content of at least 25 vol. % which may be at least 30 vol. %, or even at least 90 vol. %.

The oxidants can be provided from one or more common sources examples of which include tanks, mixing chambers, oxygen separation plants, and the like. If desired, the oxygen content of different oxidant streams fed to different burners can be identical or different. By delivering a controlled, often metered, flow to each burner it is possible to intentionally vary the amount of oxidant (and thereby vary the amount of oxygen) supplied to each burner, and therefore the stoichiometric ratio of that burner. Since a portion of the combustion air is replaced by the oxidant, flow of combustion air through the windbox or other common source is reduced and those burners operating too lean begin to operate closer to the burner's optimum stoichiometric ratio. The oxidant is preferentially fed to each burner that was operating too fuel rich, thereby enabling each one to operate closer to its optimum stoichiometric ratio. Separate supply of the oxidant also allows for simple biasing of one or more of the burners if required to mitigate waterwall corrosion or unburned carbon in ash problems associated with specific burners.

As used herein, the "optimum" stoichiometric ratio of a burner is that which the operator desires. In many cases, the "optimum" stoichiometric ratio of each burner falls within a narrow range of values, typically extending from 5% above to 5% below a given target stoichiometric ratio. This is the situation when it is desired that each burner has the same or approximately the same stoichiometric ratio. In other cases, such as where burners are arrayed in a row or in a square or rectangular configuration (such as 3×3, 3×4, 4×4, and the like), it may be desired that burners on the perimeter have one stoichiometric ratio or range of stoichiometric ratios, which are then considered "optimum" for those burners, while the burners inside the perimeter have a different stoichiometric ratio or range of stoichiometric ratios, which are in turn considered the "optimum" stoichiometric ratios for those burners. And in the cases described above where it is desired that only one or a few burners operate at modified stoichiometric ratios, reflecting aspects such as proximity to a tube wall, the "optimum" stoichiometric ratio is that which achieves the objectives of modifying the stoichiometric ratio. In addition, in those embodiments wherein fuel and oxidant are fed into the furnace from separate but adjacent ports, as shown for example in FIG. 3, it may be desired to bring the stoichiometric ratio of each pair of fuel and oxidant ports to within a range as described above, or to adjust the stoichiometric ratio of only certain pairs of adjacent ports.

In some embodiments the optimum stoichiometric ratio is based on every burner having a stoichiometric ratio lying within a range from 5% above to 5% below a given value applicable to every burner in the furnace. In other embodiments, the optimum stoichiometric ratio for at least one burner differs from that of any other burner. For instance, in other preferred embodiments the optimum stoichiometric ratio for one group of two or more burners is based on every burner in that group having a stoichiometric ratio lying within a range from 5% above to 5% below a given value, and the optimum stoichiometric ratio for a second group of two or more burners is based on every burner in that group having a stoichiometric ratio lying within a range from 5% above to 5% below a second given value. In practice, it is often preferable the predetermined optimum for the stoichiometric ratio of at least one burner is 0.6 to 1.0, more preferably 0.7 to 0.85.

The present invention provides several advantages.

The present invention can be the sole means provided for adjusting flows of air and fuel to burners, but it can advantageously be used in conjunction with one or more other flow balancing techniques. Even when the flows are balanced as well as possible with current techniques there can still be significant variation in the stoichiometric ratio from burner to burner. The present invention allows the operator to minimize the impact of these residual flow imbalances through the selective injection of a well controlled oxidant flow to individual burners.

Because the control oxidant stream is supplied through a separate feed system and can be economically well controlled, the present invention is less susceptible to problems associated with operating the boiler. For example, in the case wherein pulverized coal is the fuel and its feed rate is moderated by orifice plates, as the coal begins to erode the orifice plates used to equalize fuel flow to the burners the orifice plates become less and less effective. Since supply of the oxidant is well controlled and is independent of the normal air and fuel flows, the distribution of the oxidant can be easily modified to mitigate the increasing maldistribution of fuel. Further, for most facilities the method used to supply the control oxidant to individual burners, such as a lance, would require very little modification to the burner.

Another major advantage to use of a control oxidant is synergistic benefits achieved with a given oxidant. For example, as described in the aforementioned copending applications incorporated by reference herein, use of oxygen in a low NOx combustion system firing coal reduces NOx formation and reduces unburned carbon in the ash. Further, when oxygen or enriched air is used as the control oxidant, conventional benefits of oxygen use such as increased efficiency can be achieved. Reduced flue gas volumes can also allow a facility to overcome problems with fan capacity, or allow an increase in throughput for a given unit. On the other hand oxidants containing less than 21% oxygen such as air mixed with recycled flue gas or nitrogen enriched air can be used advantageously to reduce thermal NOx formation.

The invention will be described with reference to the Figures, although a description that refers to the Figures is not intended to limit the scope of that which is considered to be the present invention.

FIG. 1 shows combustion device 1, which can be any apparatus wherein combustion is carried out in the interior 2 of the device. Preferred combustion devices include furnaces and boilers which are used to generate steam by conventional means, not shown.

Each burner 3 in a sidewall or end wall of combustion device 1 feeds fuel, air and oxygen from sources thereof outside the combustion device 1 into the interior 2 of combustion device 1. Suitable fuels include natural gas, hydrocarbon liquids, such as fuel oil, and also include pulverulent hydrocarbon solids, a preferred example of which is pulverized coal or petroleum coke.

Figure 2:
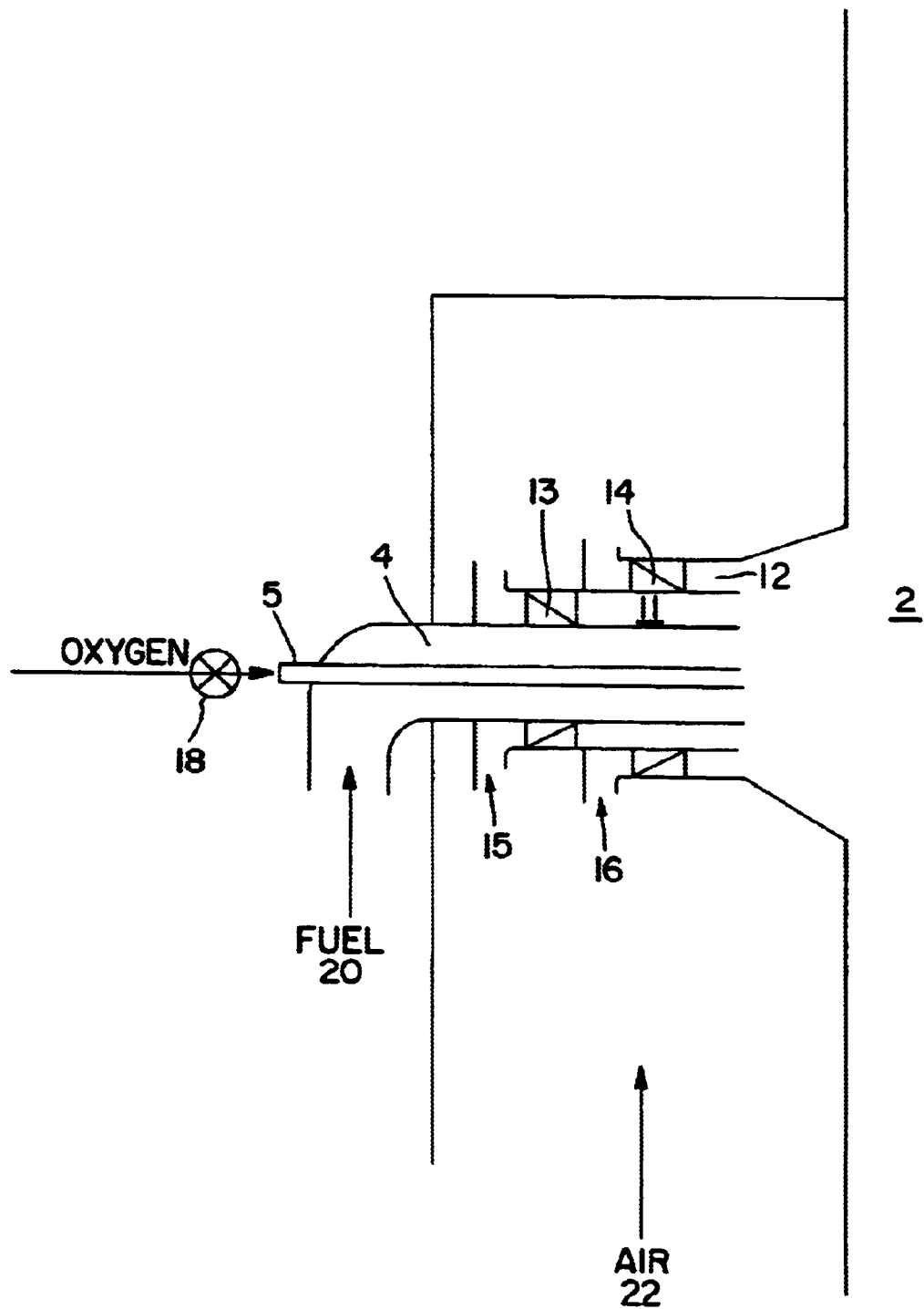
FIG. 2 is a cross-sectional representation of a burner useful for carrying out the present invention.

As seen in FIG. 1 and more closely in FIG. 2, burner 3 is preferably comprised of several concentrically arranged passages, although other constructions to the same effect can be used. The fuel is fed into combustion device 1 through annular passage 4, disposed concentrically around lance 5 through which oxygen is fed as described herein. Preferably, the fuel is transported from a supply source 20 to one or more burners 3 and propelled through burner 3 into the interior 2 of combustion device 1, by suitable pump means in the case of liquids such as fuel oil, and by blowers and impellers of conventional design in the case of hydrocarbon solids such as pulverized coal, which are conventionally fed into the combustion device with the aid of transport air or primary air. Liquid hydrocarbon fuels are preferably fed through one or more atomizing nozzles of conventional design, to feed the liquid fuel into the combustion chamber as discrete, dispersed droplets with atomizing air. An effective amount typically about 1.5 to 2.0 lb of primary air is used to transport 1 lb of coal, which corresponds to about 20% of the stoichiometric combustion air required for complete combustion of bituminous coal. For combustion of heavy oil about 0.5 to 1.0 lb of primary air is typically used to atomize 1 lb of oil.

Combustion air 22 is supplied by a forced draft (FD) fan to one or more windboxes 21 and fed to air passages of one or more burners 3. Secondary combustion air 15 is fed through burner 3 into combustion device 1, preferably through concentrically arranged annular passages 11 surrounding the annular space 4 through which the hydrocarbon fuel is fed. Preferably tertiary combustion air 16 is fed through burner 3 into combustion device 1, preferably through concentrically arranged annular passages 12 surrounding the secondary air passage. Combustion air can also be fed through over fire air port 7 (seen in FIG. 1) into combustion device 1.

Preferably the supplemental oxidant for balancing is supplied through the use of lance 5. Each lance 5 feeds oxidant to a single associated burner. There is a valve 18, or the equivalent, in each line feeding oxidant to a burner. Each valve 18 is calibrated and adjustable to permit control of the feed (rate and amount) of oxidant and thus of oxygen to the associated individual burner. In the embodiment shown in FIG. 1, oxidant is from a common source, although oxidant can instead be from different sources providing differing oxygen contents. FIG. 2 shows an arrangement for one burner, wherein the oxidant in lance 5 can be from a source common to other burners or from a source unique to the depicted burner.

Alternate delivery systems to feed oxidant to burners, such as a jet into the secondary air stream to each burner, can also be used, depending on the balancing objective and burner design.

Figure 3B:
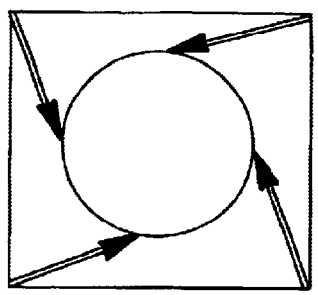
FIG. 3B is a top view of the furnace depicted in FIG. 3A, showing the tangential flow of fuel and oxidant into the furnace.
Figure 3A:
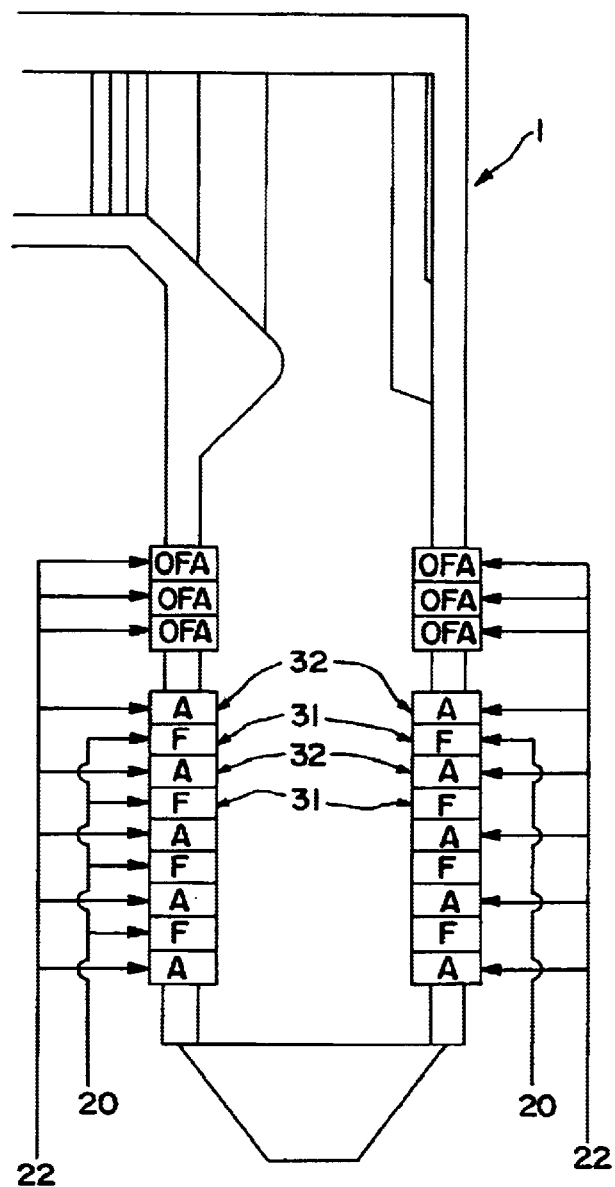
FIG. 3A is a cross-section view of another type of burner, wherein fuel and oxidant are fed from separate ports tangentially into the furnace.

Referring to FIGS. 3A and 3B, a tangentially fired furnace 1 comprises an array of ports for injecting fuel, and ports for injecting combustion air, into the furnace interior. Typically the fuel ports and the combustion air ports are arrayed in a vertical row, alternating with each other, as is illustrated in FIG. 3 wherein ports 31 for injecting fuel alternate with ports 32 for injecting combustion air. The fuel combusts in the furnace interior with the combustion air. The present invention is readily adapted to furnaces having this type of construction, for instance by providing a lance in each combustion air port for which it has been determined that oxidant needs to be injected so as to adjust the stoichiometric ratio within the furnace closer to optimum, and then feeding oxidant in the required amounts through each such lance.

EXAMPLE 1

Figure 4:
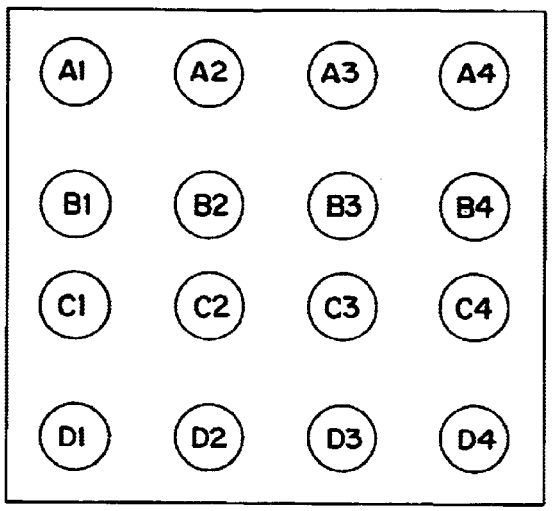
FIG. 4 is a head-on view of a typical array of burners viewed from the interior of a furnace toward the openings of the burners.

Minimizing Stoichiometric Ratio Variation in an Array of Burners for Control of NOx and Unburned Carbon in Ash This example was carried out with a furnace having a 4×4 array of burners, as shown in FIG. 4. Each horizontal row of burners was fed pulverized coal from a single mill, and a different mill was used for each row of burners. A common windbox supplied air to all the burners.

First the stoichiometric ratios and the distribution of stoichiometric ratios were determined, assuming that air and coal flow measurements are available for each burner. This permits identification of the burners having the highest and lowest stoichiometric ratios, and the values of those ratios. The data used in this example are taken from Cherry et al. ("NOx Reduction of A 165 MW Wall-Fired Boiler Utilizing Air and Fuel Flow Measurement and Control", $27^{th}$ International Conference on Coal Utilization & Fuel Systems, Mar. 4–7, 2002, Clearwater, Fla.) and are considered to represent typical distributions of coal and air flow rates to the wall mounted burners of a coal fired utility boiler. Then the necessary air flow to each burner to achieve a stoichiometric ratio of 1.22 in each burner was determined based on the coal flow rate to each. The wide variation in the necessary air flow to each burner directly reflects the variation in the coal flow rate to each burner.

Then, the oxidant replacement rate as a percentage of the stoichiometric air requirement was determined. The replacement rate is based on an oxygen mass equivalent basis. For example, 1 lb of pure oxygen would replace 4.3 lbs of dry air, which contains 1 lb of oxygen. The replacement rate depends on the oxygen content of the oxidant to be used as the replacement stream, which depends in turn on several factors including cost of the oxidant, compression cost for the oxidant, aerodynamic considerations for the burner, the amount required to satisfy the balancing requirements, emissions performance, and availability. For example, experimental data suggests that addition of oxygen to an air fired burner under fuel rich conditions reduces NOx emissions, but can increase NOx emissions under fuel lean conditions. Thus, oxygen may be the preferred control oxidant for burners operating fuel rich and air may be the preferred control oxidant for burners operating fuel lean. In the example shown here two control oxidant streams, industrial grade oxygen and separately supplied air were used and the replacement rate was defined as 10% of the stoichiometric air requirement. Oxygen was added to burners operating fuel rich conditions, i.e., below stoichiometric ratio of 1.0 after oxidant addition and air was added to burners operating fuel lean conditions. The average stoichiometric ratio of all burners was kept constant at 1.22.

Figure 5:
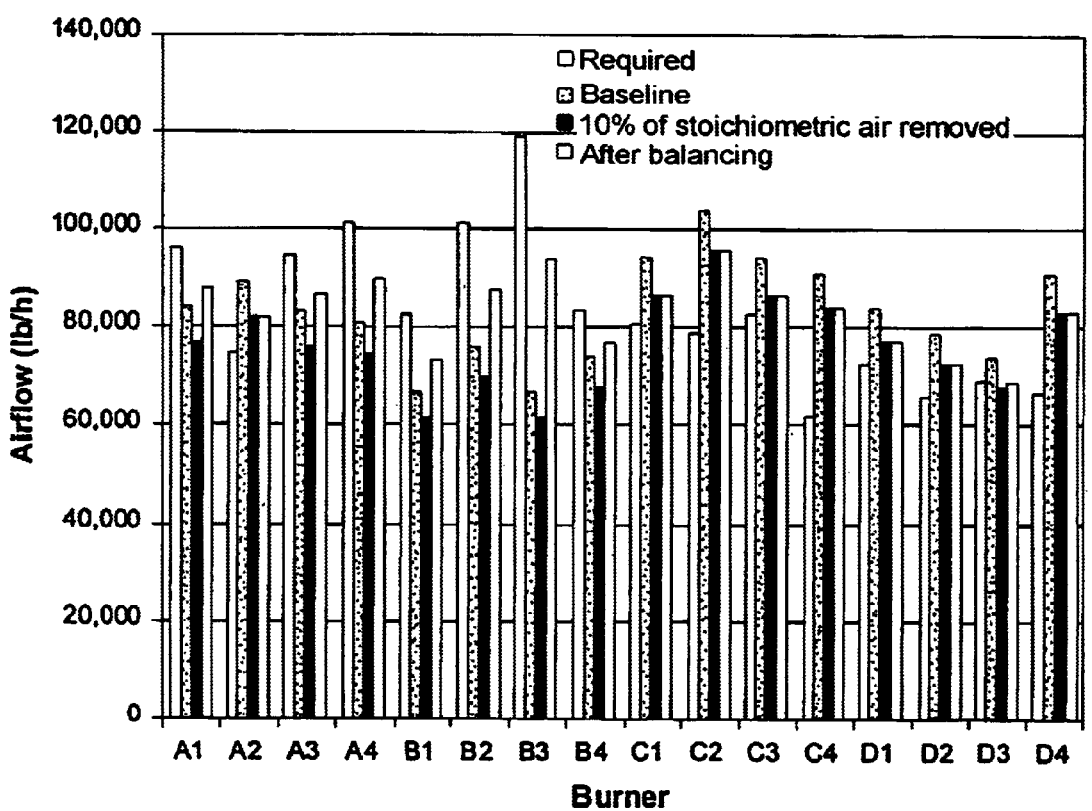
FIG. 5 is a bar graph of airflows for each of the burners shown in FIG. 4, at different points in the method of the present invention.
Figure 6:
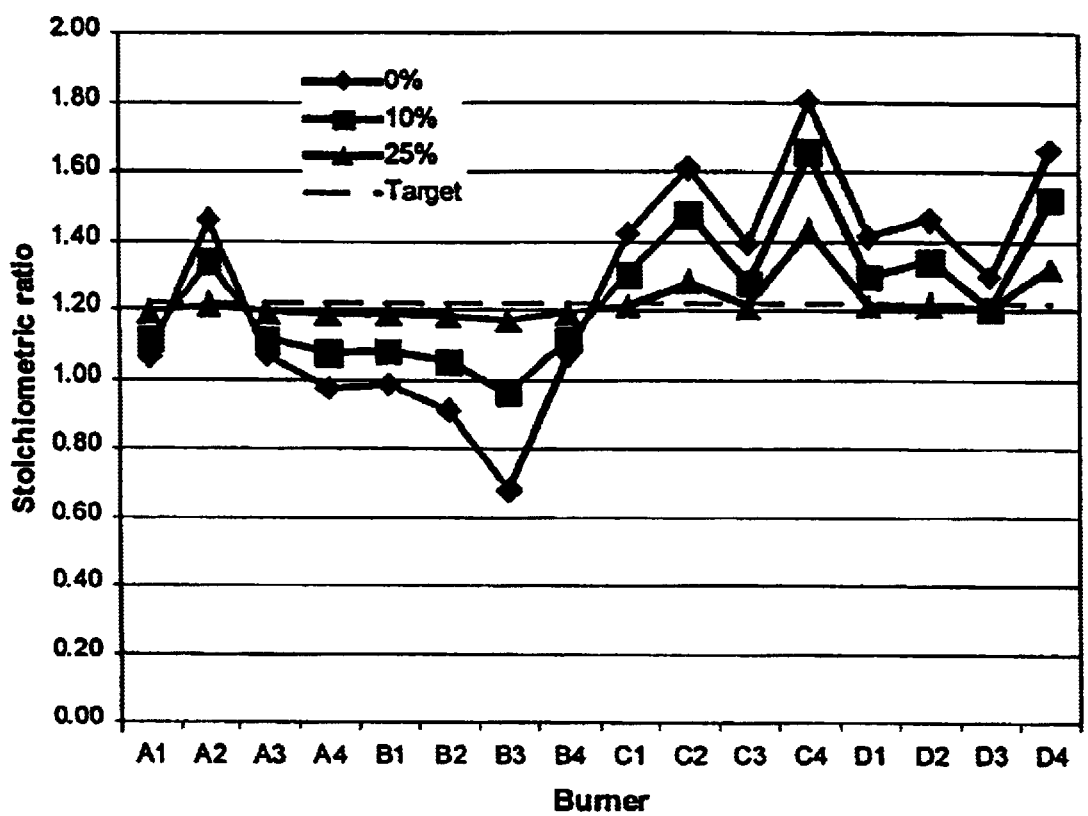
FIG. 6 is a graph of the stoichiometric ratio at each of the burners shown in FIG. 4, at different amounts by which airflow to the burner has been reduced.
Figure 7:
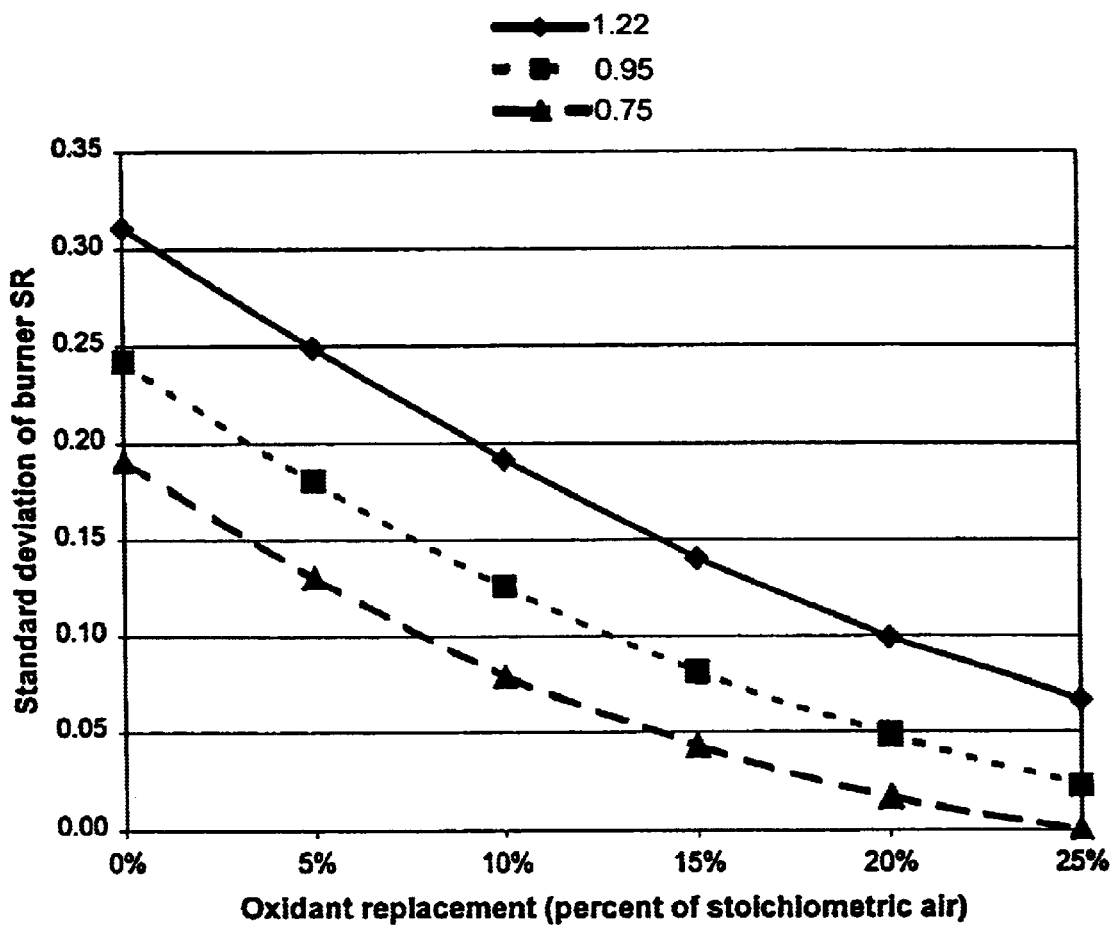
FIG. 7 is a graph of the standard deviation of the stoichiometric ratio of a burner against the percent of airflow to the burner that has been replaced by oxygen, at different stoichiometric ratios.

As can be seen from FIG. 5 the amount of air originally supplied to each burner tends to be very different from the amount required to maintain a stoichiometric ratio of 1.22, shown as "Target" in FIG. 6. This results in a significant variation in burner stoichiometric ratios, shown as "0%" in FIG. 6. Another metric of the variation in burner stoichiometric ratios is the standard deviation of burner stoichiometric ratio, which is shown in FIG. 7. It is well known that burners operating under fuel lean conditions convert more fuel nitrogen to NOx and that burners operating under fuel rich conditions produce more unburned carbon in ash. From FIG. 6, burners A2, C1 to C4 and D1 to D4 operate above 1.22 and are likely sources of most of NOx emissions. Burners B2 and B3 operate fuel rich and are likely sources of most of unburned carbon in ash.

To perform the balancing with the control oxidants first the replaced air, 10% of stoichiometric in this case, is removed from the windbox. The resulting air distribution is shown in FIG. 5. Then the controlled amount of oxidant appropriate for each burner is fed to the individual burners in order to minimize the stoichiometric ratio variations and to reduce NOx emissions. For example, the original air flow to burner B3 is much lower than required and corresponds to stoichiometric ratio (SR)=0.68. After the combustion air, 10% of stoichiometric in this case, is removed from the windbox, SR becomes about 0.58. For this burner oxygen is supplied as control oxidant and SR is increased to 0.95. The original air flow to burner A1 corresponds to SR=1.05. After the combustion air is removed from the windbox, SR becomes about 0.95. For this burner more air, as control oxidant, would be supplied than was removed—increasing the net airflow to the burner, thus increasing the burner stoichiometric ratio to 1.10. In contrast the air flow to burner A2 is much higher than required and SR is 1.37 after 10% air replacement, therefore no control oxidant is returned to the burner. In this way the stoichiometric ratios of individual burners are adjusted to approach the target ratio of 1.22 while maintaining the overall average SR=1.22. For 10 percent and 25 percent replacement the data, shown as "10%" and "25%" in FIG. 6, the variation in stoichiometric ratio is reduced, but the burners are not perfectly balanced. (When oxygen is added as control oxidant, it is converted to the equivalent air flow rate based on the contained oxygen flow rate and shown in FIG. 5.)

As mentioned above, one could define the oxidant replacement rate based on achieving perfect balancing of the stoichiometric ratios to the burners. As can be seen from FIGS. 6 and 7, increasing the replacement rate tends to reduce the burner to burner variation in stoichiometric ratio, even when the boiler is operating under a fuel rich mode. For this particular example approximately 40% replacement is required to perfectly balance the burners. If available technology is used to better balance the burners, the amount of control oxidant required is reduced.

EXAMPLE 2

Wall Biasing for Corrosion Control

Figure 8:
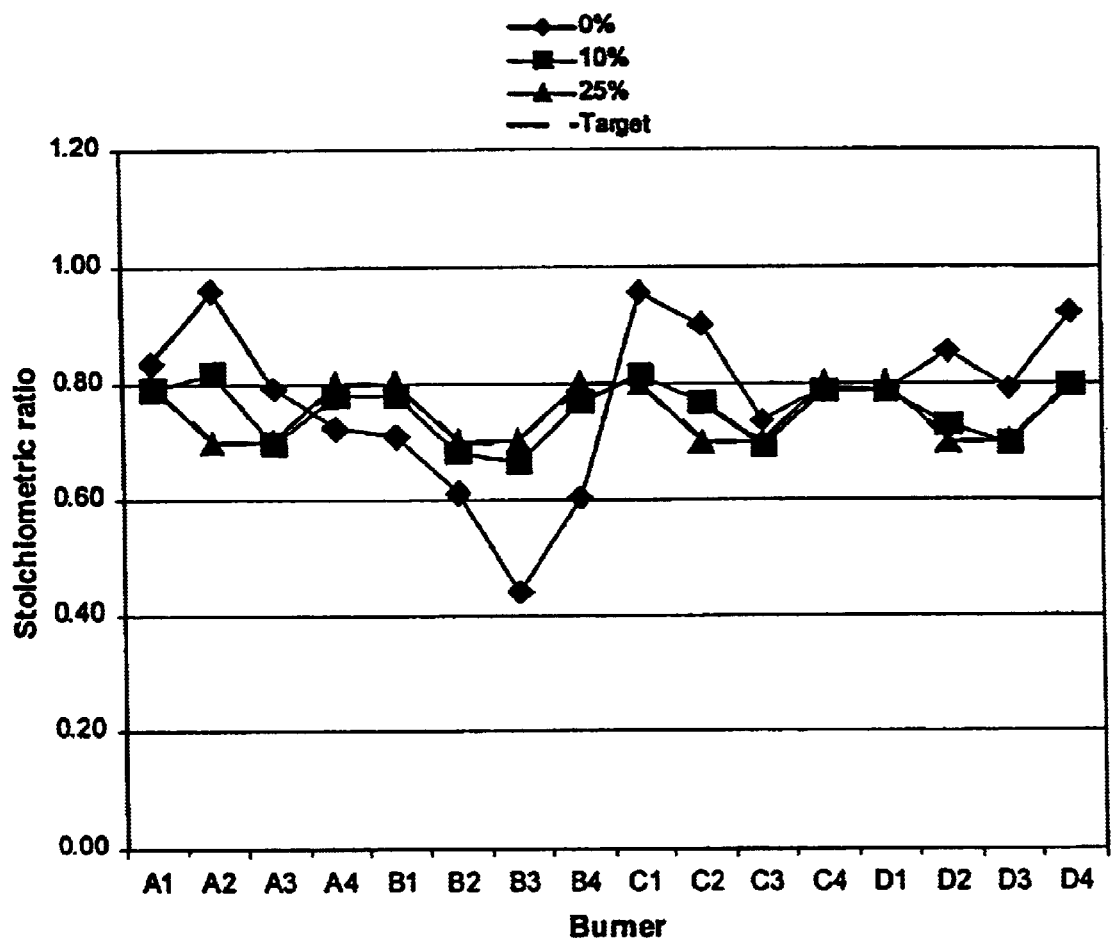
FIG. 8 is a graph of the stoichiometric ratio of each of the burners shown in FIG. 4, at different amounts by which airflow to the burner has been reduced.

When boilers are operated under fuel rich, or staging conditions, corrosion of the waterwall can be a significant problem. Corrosion typically occurs in waterwall areas where the furnace is fuel rich and high temperature, especially with slag deposits containing FeS. An example is the waterwall area on which a rich flame impinges and deposits slag with high unburned carbon. Chemical species formed in this very fuel rich zone can deposit on the waterwalls, causing corrosion of the metal surface. One way to mitigate this corrosion is to operate the burners in the corrosion region leaner than the average burner stoichiometric ratio. As with the previous example, the present invention can be used to control the stoichiometric ratio distribution among burners to minimize corrosion problems. An example of this application is shown in FIG. 8. Assuming the same burner configuration shown previously in FIG. 4, those burners in column 1 and column 4 are adjacent to the walls. To minimize waterwall corrosion the desired stoichiometric ratio distribution may be to operate those burners leaner than average, and the interior burns richer than average, as shown in FIG. 8. As with the previous example the air being replaced by the control oxidant is first removed from the windbox. This results in lower burner stoichiometric ratios across the entire furnace. The control oxidant is then added to back to the burners in columns 1 and 4 to achieve the desired stoichiometric ratio distribution. As can be seen from FIG. 8 the more control oxidant is used the closer the resulting stoichiometric ratio distribution is to the optimum. Experimental data suggests that addition of oxygen to an air fired burner operating under fuel rich conditions reduces unburned carbon in ash. Thus, oxygen is the preferred control oxidant for burners causing high unburned carbon in ash.

EXAMPLE 3

Elevation Biasing for NOx Control

Figure 9:
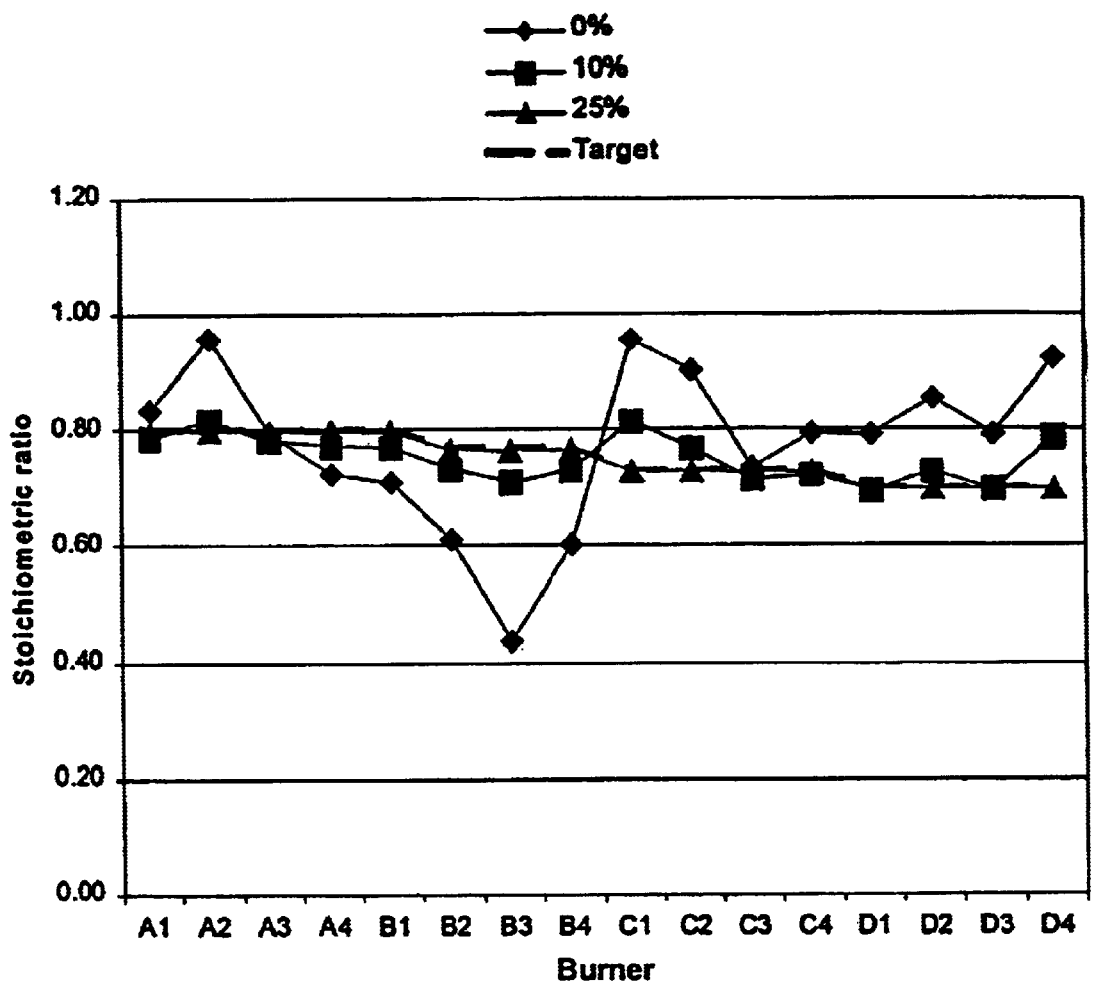
FIG. 9 is a graph of the stoichiometric ratio of each of the burners shown in FIG. 4, at different amounts by which airflow to the burner has been reduced.

Another application of the invention is to intentionally bias the stoichiometric distribution to enhance the effectiveness of staged combustion while minimizing operational problems. The exact biasing strategy required would depend on parameters such as the furnace size, burner arrangement, fuel type, and type of control oxidant used. For example, either operator experience or analytical methods such as computational fluid dynamics may suggest that the reactions that reduce NOx are kinetically limited in some areas. In other areas there may not be sufficient residence time available for complete carbon conversion under fuel rich operation. The control oxidant could be injected into specific burners or burner elevations to minimize the effect of residence time and kinetic limitations. Although the optimal distribution will be boiler and fuel specific, one general method could be to bias the burners such that the lowest elevation operates richer than the average, while the upper burners operate leaner than the average. This method increases NOx reduction from the bottom rows of burners, which have the longest residence time, since the burners are operating more fuel rich. The upper row of burners, which have the shortest residence time, operate leaner, but still fuel rich, which reduces the carbon in the ash. FIG. 9 illustrates this approach. The bottom row of burners, elevation D, is operated at SR=0.7. The uppermost elevation of burners, elevation A, operates at a SR=0.80. By first removing air from the windbox and then feeding control oxidant to those burners operating richer than desired it is possible to get very close to the desired stoichiometric ratio distribution.

EXAMPLE 4

Figure 10:
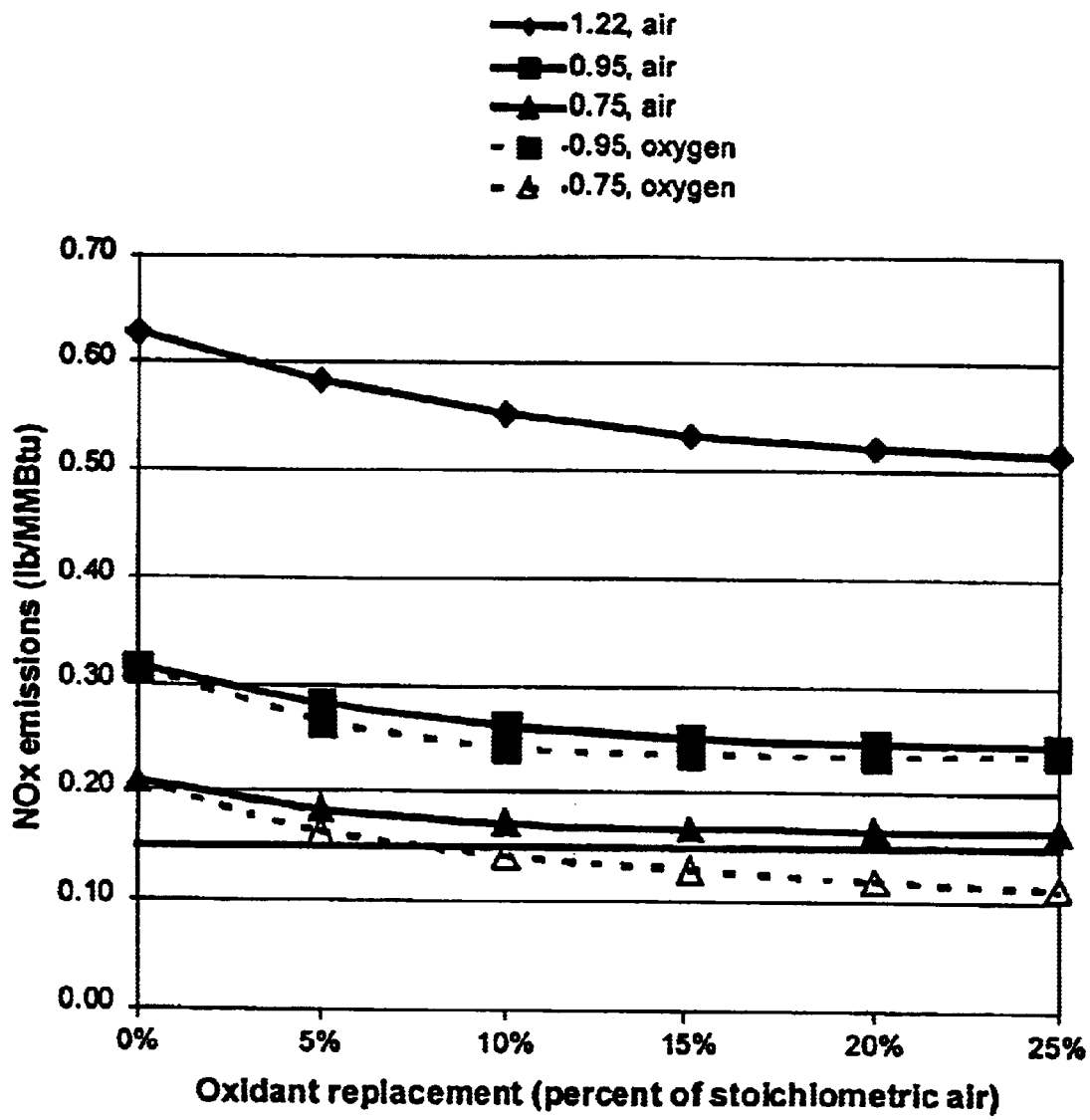
FIG. 10 is a graph of NOx emissions in pounds per million BTU's generated in a furnace, against the percent of airflow to the furnace that has been replaced by oxygen, at different stoichiometric ratios and for different replacement oxidants.

Deeper Staging and Burner Balancing for Control of NOx and of Unburned Carbon in Ash Yet another example of how the invention could be applied is to use oxygen, or oxygen enriched air, as the control oxidant to allow deeper staging without increasing CO emissions and unburned carbon in ash. As discussed above, deeper staging, i.e., reducing main combustion zone stoichiometric ratio by operating the burners more fuel rich while supplying the balance of the air from overfire air, is an effective way of reducing NOx emissions. However, deep staging in a coal fired boiler often results in unacceptably high CO emissions and high unburned carbon in ash, which puts a limit on the minimum stoichiometric ratio on the primary combustion zone. For this reason most wall fired boilers with overfire air operate at above SR=0.95, while the minimum NOx may be attainable at about SR=0.7. It is also known that high CO emissions and unburned carbon in ash are caused by a few burners operating much richer than the average SR. As discussed in Example 1, the present invention allows minimizing the variation in the burner stoichiometric ratio distribution, and thus solves the problem of having a few burners operating at very rich conditions. Elimination of these very fuel rich burners allows deeper overall staging without increasing CO emissions and unburned carbon in the ash. The result of reducing the average stoichiometric ratio while balancing the individual burner stoichiometric ratios is shown in FIG. 10. The horizontal line at 0.15 lb/MMBTU represents the target NOx emission level.

A number of added benefits can be seen when oxygen or oxygen enriched air is used. One benefit of using oxygen as the control oxidant is that both unburned carbon in the ash and NOx are reduced when oxygen is used under staging conditions. A detailed experimental study demonstrated that replacing air with oxygen in a utility burner operated under staging conditions can significantly reduce both NOx and unburned carbon. Using these data and the situation described in Example 1 it is possible to illustrate how use of this invention can reduce NOx, particularly when oxygen is used. FIG. 10 shows how the estimated NOx emissions from the boiler change as a function of both the burner stoichiometric ratio (assuming additional air is injected as overfire air) and the replacement rate. As can be seen from this figure the effectiveness of oxygen for NOx control is enhanced as the burners are operated fuel rich.

Referring to FIG. 2, preferably, the oxygen is fed into the interior 2 of the device apart from the secondary and tertiary combustion air. That is, the oxygen that is fed through burner 3 in accordance with this invention is preferably not commingled with the secondary and tertiary combustion air before or after it is fed into combustion device 1, especially when no over fire air is used.

For this application preferred low NOx burners have primary (fuel transport), secondary and tertiary air passages for good aerodynamic adjustability. However, other burner designs can be used. Once the optimum settings with the three passages have been determined, the secondary air swirl vanes and passage can be designed to create about the same aerodynamic mixing characteristics as with the three-passage design. Alternatively, burners with an additional (quaternary) passage can be used (such as the RSFC™ burner described in U.S. Pat. No. 5,960,724).

Preferably, the secondary and tertiary combustion air are fed at the burner 3 so as to swirl about a longitudinal axis, thereby creating a recirculation zone near each burner and improving the stability of flame and commingling of air and fuel. Swirl can be achieved by known techniques, such as providing deflectors, 13 and 14, in the annular passages for secondary and tertiary air flow of the burner which direct the flow of the streams in the desired swirling direction. It is preferred to provide a high degree of swirl, preferably a swirl number, as defined in "Combustion Aerodynamics", J. M. Beer and N. A. Chigier, Robert E. Krieger Publishing Company, Inc., 1983, of 0.6 to 2.0.

Before a combustion device is retrofitted in accordance with the present invention as described in this example, lance 5 for feeding oxygen is not yet present. Combustion is carried out between the hydrocarbon fuel and the oxygen in the combustion air, resulting in formation of a flame 6. The region 8 of the flame closest to the end of burner 3, that is, where the hydrocarbon fuel emerges from the burner, is a fuel-rich zone. The area of the flame 6 around its periphery, is relatively lean, as secondary and tertiary combustion air has not been fully reacted with fuel. When a sufficient amount of air is fed from over fire air port 7 for global combustion staging, the entire lower zone of the furnace, or primary combustion zone (PCZ) 10, below over fire air port 7 becomes fuel rich, except the areas near burners 3 where air is injected and not yet fully reacted with fuel.

Then, lance 5 is added. Alternatively, a burner that feeds fuel and combustion air is replaced with a burner that performs as shown in the Figures. The amount of air fed to the burner through the windbox is then reduced by the total amount of control oxidant to be fed through all burners. Preferably the total amount of air and oxidant fed through burner 3, i.e., the sum of primary, secondary and tertiary air, is between 60 and 95% of the stoichiometric air requirement for complete combustion. Most preferably the total amount of air and oxidant fed through burner 3 is about 70 to 85% of the stoichiometric air requirement for complete combustion.

The velocity of each stream of combustion air is preferably 50 to 200 feet per second. The velocity of the oxygen injected through lance 5 is preferably within 50% to 200% of the velocity of the primary air.

Due to the relatively small amount of oxygen used, only modest increases in the oxygen concentration of air are achieved when mixed uniformly even when oxygen is mixed only with the transport air. A preferred method is to inject oxygen into the coal/air transport stream at the tip of the nozzle. In this case some of the coal particles are mixed with oxygen jets and locally create zones of high $O_2$ concentration around coal particles. Such conditions may provide zones of rapid ignition sources and facilitate early ignition and devolatilization as compared to the case oxygen is premixed with the transport air stream.

Another preferred method is to inject oxygen from the inner or outer annular space adjacent to the coal stream. In this case the favorable oxygen rich combustion condition is provided at the boundary of the coal and oxygen streams.

When oxygen is injected separately at high velocity parallel to the fuel stream, as was the case for Farmayan, et al., ("NOx and Carbon Emission Control in Coal-Water Slurry Combustion", Sixth International Symposium on Coal Slurry Combustion and Technology, Orlando, Fla., Jun. 25–27, 1984), the oxygen jet(s) may be diluted quickly with surrounding gases and its effectiveness may be retarded. Thus, the method of oxygen injection has to be carefully designed.

Injection or mixing of oxygen into the tertiary air and quaternary, if used, should be avoided in an aerodynamically staged burner without OFA. In theory the optimization of local stoichiometric condition can be done with any oxidants including air. However, oxygen is more effective because only a small volume is required and local stoichiometric condition can be changed without a large impact on the overall aerodynamic mixing conditions of the flame.

Another important requirement is that oxygen enrichment has to be done in such a way as to preserve or enhance the physical size of the fuel rich zone (the "$N_2$ forming zone") of an aerodynamically staged flame. The method of oxygen injection and the consequent reduction of air flows in certain air passages of a burner would influence the aerodynamic staging conditions of the burner, and hence the physical size and the local stoichiometric conditions. If the size of the fuel rich zone is reduced and the average gas residence time in the fuel rich zone is reduced as a result of oxygen injection, such a change could cause NOx increases. Complex impacts of oxygen injection on the burner aerodynamic conditions have to be evaluated carefully for a specific burner to achieve NOx reduction.

The examples discuss a number of ways to practice this invention. In all cases it was assumed that a measurement of air and coal flows was available. Another way the invention can be practiced is to use either CFD (computational fluid dynamics) modeling or gas sensors in the flue gas to determine the stoichiometric ratios leading to measured degree of burner imbalance. The control oxidant could then be added to those burners that are operating more rich than others, as measured by such parameters as oxygen in the flue and CO. This approach requires an iterative 'tuning' application of the invention.

Other ways to practice the invention include utilization of different control oxidants in different burners. For example, in a scenario where the burners are biased by elevation to create a very fuel rich region at the bottom of the furnace and a less fuel rich region at the top of the furnace it may be advantageous to use oxidant streams having differing oxygen contents for each burner or each row of burners. Since adding oxygen to burners operating closer to stoichiometric can increase thermal NOx formation, air may be used for these burners. As discussed in Example 4 and the copending applications, in burners operating more fuel rich the use of oxygen tends to reduce NOx formation, therefore oxygen could be used in the lower burners.

When industrial purity oxygen, or highly enriched air, is used determination of the optimum amount of oxidant to each burner is an important issue. In general oxygen is most effective to burners operating at relatively low temperature with shorter residence time, i.e., flames with kinetic limitations for NOx reduction. Those burners adjacent to the waterwalls and the top row burners, if operated under fuel rich conditions, can benefit from use of oxygen containing at least 25 vol. % oxygen, preferably at least 50 vol. % oxygen, and more preferably at least 95 vol. % or even technically pure oxygen ($\geq$99% pure).

Several methods are possible for addition of the control oxidant. In the examples it was assumed that the control oxidant was added to the burner through the use of a lance inserted through the coal pipe. (See FIG. 2.) This method offers the advantage of requiring the least burner modifications since many burners have a central guide pipe through the coal pipe. Other methods include a sparger type arrangement whereby the control oxidant is added to the secondary burner flows in the burner itself. Yet another arrangement could be to add the control oxidant to the coal pipe. These methods may create back pressure in these lines, which would change the base air and coal distribution in the burners—making an iterative balancing approach much more difficult.

What is claimed is:

1. A method for combusting hydrocarbonaceous fuel in a furnace comprising (A) providing a furnace which comprises a plurality of burners, means for supplying combustion air to each of said plurality of burners including a common source for the combustion air fed to said plurality of burners, and means for supplying hydrocarbonaceous fuel to each of said plurality of burners, wherein at least one of said plurality of burners is operating at a stoichiometric ratio based on the fuel and combustion air being supplied thereto that is above a predetermined optimum, and (B) reducing the flow rate of combustion air through said common source to said plurality of burners to the extent that (1) at least one of said plurality of burners is still operating at a stoichiometric ratio, based on the fuel and combustion air being supplied thereto taking into account said reduced flow rate, that is equal to or above said predetermined optimum, and that (2) at least one of said plurality of burners is operating at a stoichiometric ratio, based on the fuel and combustion air being supplied thereto taking into account said reduced flow rate, that is below a predetermined optimum for that burner, and separately feeding gaseous oxidant to at least one of said plurality of burners which is operating at a stoichiometric ratio that is below its predetermined optimum, in an amount of said oxidant such that the stoichiometric ratio of said burner based on the amount of said oxidant and on the reduced flow of combustion air thereto is closer to said predetermined optimum.

2. A method according to claim 1 wherein the fuel comprises coal.

3. A method according to claim 1 wherein the furnace employs staged combustion process and comprises means for supplying overfire air into the furnace.

4. A method according to claim 1 wherein the optimum stoichiometric ratio is based on every burner of the furnace having a stoichiometric ratio lying within a range from 5% above to 5% below one given value.

5. A method according to claim 1 wherein the optimum stoichiometric ratio for at least one burner differs from that of any other burner.

6. A method according to claim 1 wherein the optimum stoichiometric ratio for one group of two or more burners is based on every burner in that group having a stoichiometric ratio lying within a range from 5% above to 5% below a given value, and the optimum stoichiometric ratio for a second group of two or more burners is based on every burner in that group having a stoichiometric ratio lying within a range from 5% above to 5% below a second given value.

7. A method according to claim 1 wherein the oxidant fed in step (B) has an oxygen content of at least 25 vol. %.

8. A method according to claim 1 wherein the oxidant fed in step (B) has an oxygen content of at least 90 vol. %.

9. A method according to claim 1 wherein oxidant fed to at least one burner has an oxygen content different from the oxygen content of oxidant fed to any other burner.

10. A method according to claim 3 wherein said predetermined optimum for the stoichiometric ratio of at least one burner is 0.6 to 1.0.

11. A method according to claim 3 wherein said predetermined optimum for the stoichiometric ratio of at least one burner is 0.7 to 0.85.

12. A method according to claim 1 wherein the total flow rate of said gaseous oxidant separately fed to at least one burner is 1 to 20% of the stoichiometric oxygen required for the combustion of said hydrocarbonaceous fuel fed to said burner.

13. A method according to claim 1 wherein the total flow rate of said gaseous oxidant separately fed to at least one burner is 5 to 10% of the stoichiometric oxygen required for the combustion of said hydrocarbonaceous fuel fed to said burner.

* * * * *